United States Patent
Williams et al.

(10) Patent No.: US 12,419,414 B2
(45) Date of Patent: Sep. 23, 2025

(54) MOTORIZED HORIZONTAL SUPPORT SYSTEM

(71) Applicant: Ancra International LLC, Azusa, CA (US)

(72) Inventors: Robert Joseph Williams, West Chester, OH (US); Jerome Thomas Jones, Independence, KY (US); Gregory Alan Kauffman, Cincinnati, OH (US)

(73) Assignee: Ancra International LLC, Hebron, KY (US)

( * ) Notice: Subject to any disclaimer, the term of this patent is extended or adjusted under 35 U.S.C. 154(b) by 705 days.

(21) Appl. No.: 17/777,919

(22) PCT Filed: Dec. 9, 2020

(86) PCT No.: PCT/US2020/063940
§ 371 (c)(1),
(2) Date: May 18, 2022

(87) PCT Pub. No.: WO2021/126619
PCT Pub. Date: Jun. 24, 2021

(65) Prior Publication Data
US 2022/0400849 A1 Dec. 22, 2022

Related U.S. Application Data

(60) Provisional application No. 62/951,342, filed on Dec. 20, 2019.

(51) Int. Cl.
*A47B 57/00* (2006.01)
*A47B 57/08* (2006.01)
*B60P 7/15* (2006.01)

(52) U.S. Cl.
CPC ............. *A47B 57/08* (2013.01); *B60P 7/15* (2013.01); *A47B 2220/0022* (2013.01)

(58) Field of Classification Search
CPC ......... B60P 7/0815; B60P 3/007; B60P 7/135; B60P 1/02; B60P 1/4421; B60P 7/15;
(Continued)

(56) References Cited

U.S. PATENT DOCUMENTS 4,563,121 A * 1/1986 Drews .................. B60P 1/4421
414/545
5,829,605 A 11/1998 Poitras
(Continued)

FOREIGN PATENT DOCUMENTS

EP 0 849 114 A1 6/1998
EP 1195291 A2 * 4/2002 ................ B60P 1/02
(Continued)

OTHER PUBLICATIONS

International Preliminary Report on Patentability received for PCT Patent Application No. PCT/US2020/063940, mailed on Jun. 30, 2022, 8 pages.
(Continued)

*Primary Examiner* — Steven O Douglas
(74) *Attorney, Agent, or Firm* — Shook, Hardy & Bacon L.L.P.

(57) ABSTRACT

A motorized horizontal support system may include first and second vertical tracks that are configured to be installed upon opposing walls of a cargo compartment; first and
(Continued)

second brackets that each slide along the respective first and second vertical tracks; a horizontal support disposed between and fixed with respect to the first and second brackets, where the horizontal support includes a first inner passageway extending along a length of the horizontal support; a first balance cable extending through the first inner passageway of the horizontal support; a motor operatively engaged with the second bracket, where operation of the motor may cause the first and second brackets to slide upwardly or downwardly along the respective first and second vertical tracks; and a controller with user input capability that may selectively control the operation of the motor.

14 Claims, 10 Drawing Sheets

(58) Field of Classification Search
CPC ... B60P 7/06; B60P 1/00; A47B 57/08; A47B 2220/0022; A47B 5/06; A61G 3/0866
USPC .......................................................... 410/150
See application file for complete search history.

(56) References Cited

U.S. PATENT DOCUMENTS

| | | | | |
|---|---|---|---|---|
| 8,388,287 B2 * | 3/2013 | Arnold | ...................... | B60P 7/15 |
| | | | | 410/150 |
| 2013/0266393 A1 * | 10/2013 | Calico | ...................... | B60P 7/15 |
| | | | | 410/152 |

FOREIGN PATENT DOCUMENTS

| | | | | | |
|---|---|---|---|---|---|
| FR | 2589458 | * | 5/1987 | ................ | B60P 1/44 |
| FR | 2589458 A1 | | 5/1987 | | |

OTHER PUBLICATIONS

Office Action received for Canada Application No. 3161123, mailed on Oct. 27, 2023, 8 pages.
Communication pursuant to Article 94(3) EPC issued in European Application No. 20845458.7, mailed Aug. 28, 2024, 6 pages.
International Search Report and Written Opinion from corresponding International Application No. PCT/US2020/063940, 13 pp., Mar. 23, 2021.
Notice of Allowance received for Canadian Patent Application No. 3161123, mailed on Mar. 18, 2025, 1 page.

* cited by examiner

MOTORIZED HORIZONTAL SUPPORT SYSTEM

RELATED APPLICATIONS

The present patent document is a § 371 filing based on PCT Application Serial No. PCT/US2020/063940, filed Dec. 9, 2020 (and published as WO 2021/126619 A1 on Jun. 24, 2021), designating the United States and published in English, which claims the benefit of the filing date under 35 U.S.C. § 119(e) of U.S. Provisional Patent Application Ser. No. 62/951,342, filed Dec. 20, 2019. All of the foregoing applications are hereby incorporated by reference in their entirety.

TECHNICAL FIELD

The disclosure relates to motorized horizontal support systems, such as captive beam systems. Captive beam systems include decking beams with components that slide within vertical tracks fixed to opposite walls of a cargo compartment. The decking beam can be stowed close to the ceiling of the cargo compartment when not needed for use, and can be selectively lowered to a position for loading cargo or for shoring purposes. The ends of the decking beams slide within the tracks and include locking features that can selectively lock the ends of the decking beams with respect to the tracks at various heights along the tracks. An automated method to raise and lower captive beams is desired to allow a user to efficiently load or unload a cargo compartment.

BRIEF SUMMARY

One general aspect of the present disclosure includes a motorized horizontal support system, including: first and second vertical tracks that are configured to be installed upon opposing walls of a cargo compartment, where each of the first and second vertical tracks includes a plurality of apertures disposed spacingly therealong; first and second brackets that each slide along the respective first and second vertical tracks; a horizontal support disposed between and fixed with respect to the first and second brackets, where the horizontal support includes a first inner passageway extending along a length of the horizontal support; a first balance cable extending through the first inner passageway of the horizontal support, where the first balance cable includes a first end and an opposite second end; a motor operatively engaged with the second bracket, where operation of the motor in a first direction causes the first and second brackets to slide upwardly along the respective first and second vertical tracks, and where operation of the motor in an opposite second direction causes the first and second brackets to slide downwardly along the respective first and second vertical tracks; and a controller with user input capability, where the controller selectively controls the operation of the motor to selectively raise or lower a vertical position of both of the first and second brackets upon the respective first and second vertical tracks in response to an input received from an input device.

Another general aspect of the present disclosure includes a motorized horizontal support system, including: first and second vertical tracks that are configured to be installed upon opposing walls of a cargo compartment, where each of the first and second vertical tracks includes a plurality of apertures disposed spacingly therealong; first and second brackets that each slide along the respective first and second vertical tracks; a horizontal support disposed between and fixed with respect to the first and second brackets, where the horizontal support includes an inner passageway extending along a length of the horizontal support; a first balance cable extending through the inner passageway of the horizontal support, where the first balance cable includes a first end and an opposite second end; a frame configured to be secured with respect to a ceiling of the cargo compartment, where the frame includes an adjustment mechanism and a pulley; a motor operatively engaged with the second bracket, where operation of the motor in a first direction causes the first and second brackets to slide upwardly along the respective first and second vertical tracks, and where operation of the motor in an opposite second direction causes the first and second brackets to slide downwardly along the respective first and second vertical tracks; and a controller with user input capability, where the controller selectively controls the operation of the motor to selectively raise or lower a vertical position of both of the first and second brackets upon the respective first and second vertical tracks in response to an input received from an input device.

Another general aspect of the present disclosure includes a method for adjusting a motorized horizontal support system, including the steps of: providing first and second vertical tracks on opposite walls of a cargo compartment, each of the first and second vertical tracks including a plurality of apertures disposed spacingly therealong; providing first and second brackets slidably mounted upon the respective first and second vertical tracks; providing a horizontal support disposed between and fixed with respect to the first and second brackets, where the horizontal support includes an inner passageway extending along a length of the horizontal support; providing a first balance cable extending through the inner passageway of the horizontal support, where the first balance cable includes a first end and an opposite second end; providing a motor operatively engaged with the second bracket, where operation of the motor in a first direction causes the first and second brackets to slide upwardly along the respective first and second vertical tracks, and where operation of the motor in an opposite second direction causes the first and second brackets to slide downwardly along the respective first and second vertical tracks; and controlling a vertical position of the first and second brackets along the respective first and second vertical tracks, based upon inputs from a user from an input device, by selectively controlling the operation of the motor to selectively raise or lower the vertical position of both of the first and second brackets upon the respective first and second vertical tracks.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION

Figure 1:
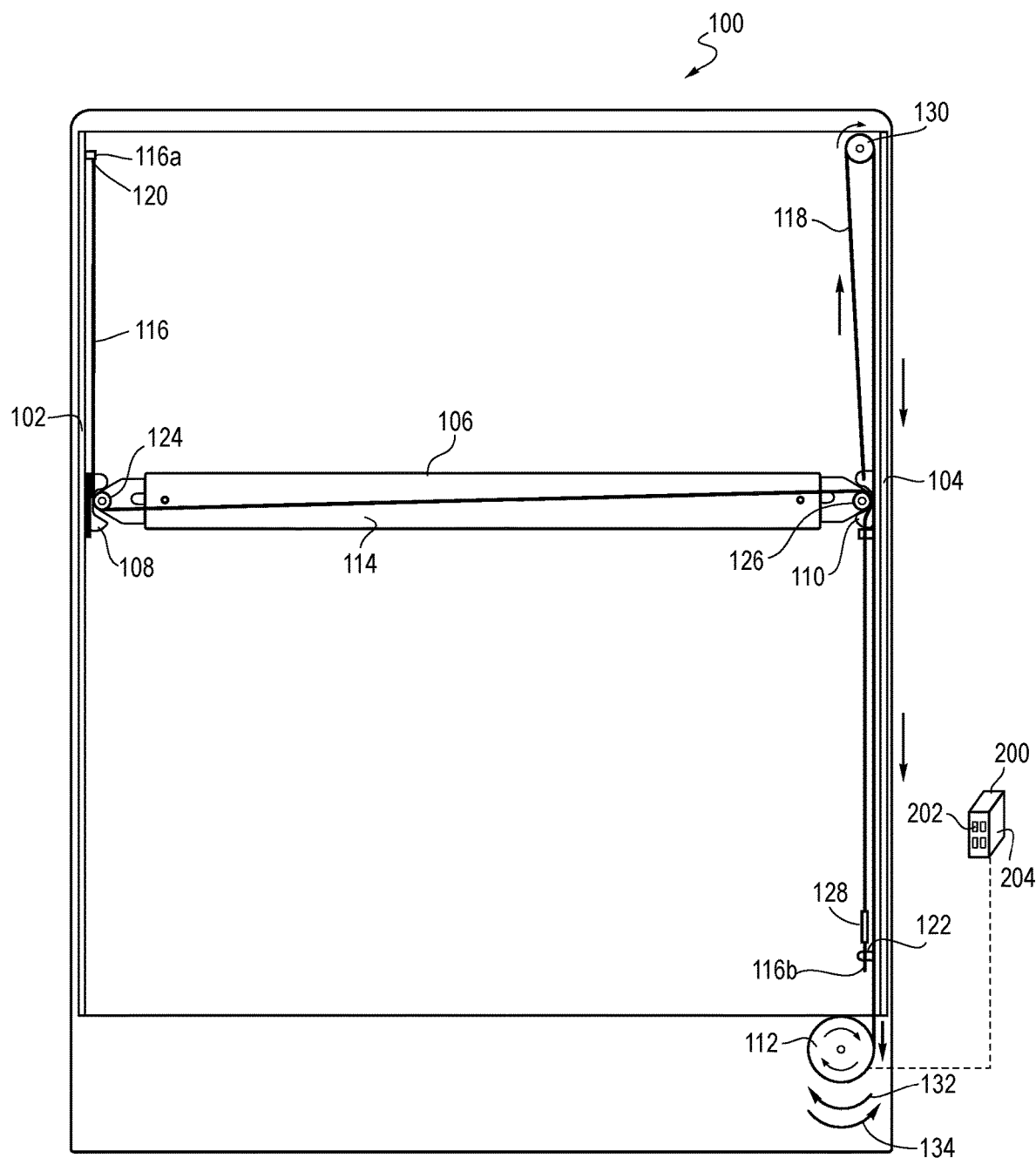
FIG. 1 is a schematic rear view of an embodiment of a motorized horizontal support system connected to opposite side walls of a cargo compartment, such as a trailer.

Turning now to FIGS. 1-7, a motorized horizontal support system 100 is provided. The system 100 allows for selectively raising and lowering a horizontal support 106 that is operatively engaged between first and second vertical tracks 102 and 104 that are mounted upon opposite walls within a cargo container, such as the cargo compartment of a semi-trailer. The system 100 is provided to allow for a user to remotely set a height of the horizontal support 106 within the cargo compartment, either with the horizontal support 106 loaded with cargo, or with the horizontal support 106 unloaded with cargo.

In some embodiments, the horizontal support 106 may include one or more decking beams that may operate individually. In some embodiments, the horizontal support 106 may include a plurality of adjacent decking beams that are fixed to a horizontal surface (e.g., with a horizontal support surface disposed above the plurality of adjacent decking beams) and are controlled to operate in unison. In some embodiments, the horizontal support 106 may include a composite horizontal load carrying assembly that includes multiple enclosed or partially enclosed cavities or lumens (e.g., including a rigid horizontal surface with one or more passageways for a cable to pass therethrough). In some embodiments, the horizontal support 106 may include an engineered panel system that may be customized for different industry applications, such as with a multi-layer sandwich design. For the sake of brevity, different embodiments of the motorized horizontal support system 100 may be described below with respect to selected embodiment(s) of the horizontal support 106, while other embodiments of the horizontal support 106 may also be used in those embodiments of the system 100. One of ordinary skill in the art, with a thorough review of the subject specification and figures, will readily comprehend how the other embodiments of the horizontal support 106 may be successfully implemented in each of the embodiments of the motorized horizontal support system 100 disclosed herein without undue experimentation.

The system 100 includes opposed first and second vertical tracks 102 and 104, and in some embodiments a plurality of opposed vertical tracks, that are disposed upon opposite sides of the cargo compartment. Each of the first and second vertical tracks 102 and 104 has a plurality of apertures disposed spacingly therealong. The first and second vertical tracks 102 and 104 respectively receive first and second brackets 108 and 110 slidable therealong. A horizontal support 106 (e.g., a decking beam) may be disposed between and fixed with respect to the first and second brackets 108 and 110. Each bracket is slidable along the length of the respective vertical track and selectively moved upward and downward with a motor 112, which when operating moves the positions of the first and second brackets 108 and 110 upon the respective vertical tracks 102 and 104, as described in greater detail below.

The first and second brackets 108 and 110 may respectively support first and second latches that slide along the respective vertical tracks 102 and 104. The first and second latches are configured to selectively engage respective apertures disposed on the respective first and second vertical tracks 102 and 104 such that the horizontal support 106 can be secured with respect to the first and second vertical tracks 102 and 104 at a desired height. That is, in use, the operation of the motor 112 is selectively controlled to selectively raise or lower the vertical position of both of the first and second brackets 108 and 110 such that the first and second latches are aligned with and engage respective apertures disposed on the respective first and second vertical tracks 102 and 104 such that the horizontal support 106 can be secured with respect to the first and second vertical tracks 102 and 104 at a desired height.

The system 100 may also include a controller (204, shown schematically with respect to an input device 200) with user input capability, where the controller 204 selectively controls the operation of the motor 112 to selectively raise or lower a vertical position of both of the first and second brackets 108 and 110 upon the respective first and second vertical tracks 102 and 104 in response to an input received from an input device 200. Example configurations of the controller, input device, brackets, latches, horizontal supports, connection between the horizontal support and the brackets, methods of using the latches to secure the horizontal support to desired apertures upon respective vertical tracks, and methods of using the input device to automatically control the operation of the motor so as to adjust the position of the horizontal support with respect to the vertical tracks are described in U.S. non-provisional application Ser. No. 16/285,949, titled "REMOTELY ADJUSTABLE CAPTIVE BEAM SYSTEM," filed Feb. 26, 2019 and U.S. provisional application No. 62/810,734, titled "BREAKAWAY SYSTEM FOR CAPTIVE BEAM SYSTEM," filed Feb. 26, 2019, which are hereby incorporated by reference in their entirety.

Figure 8:
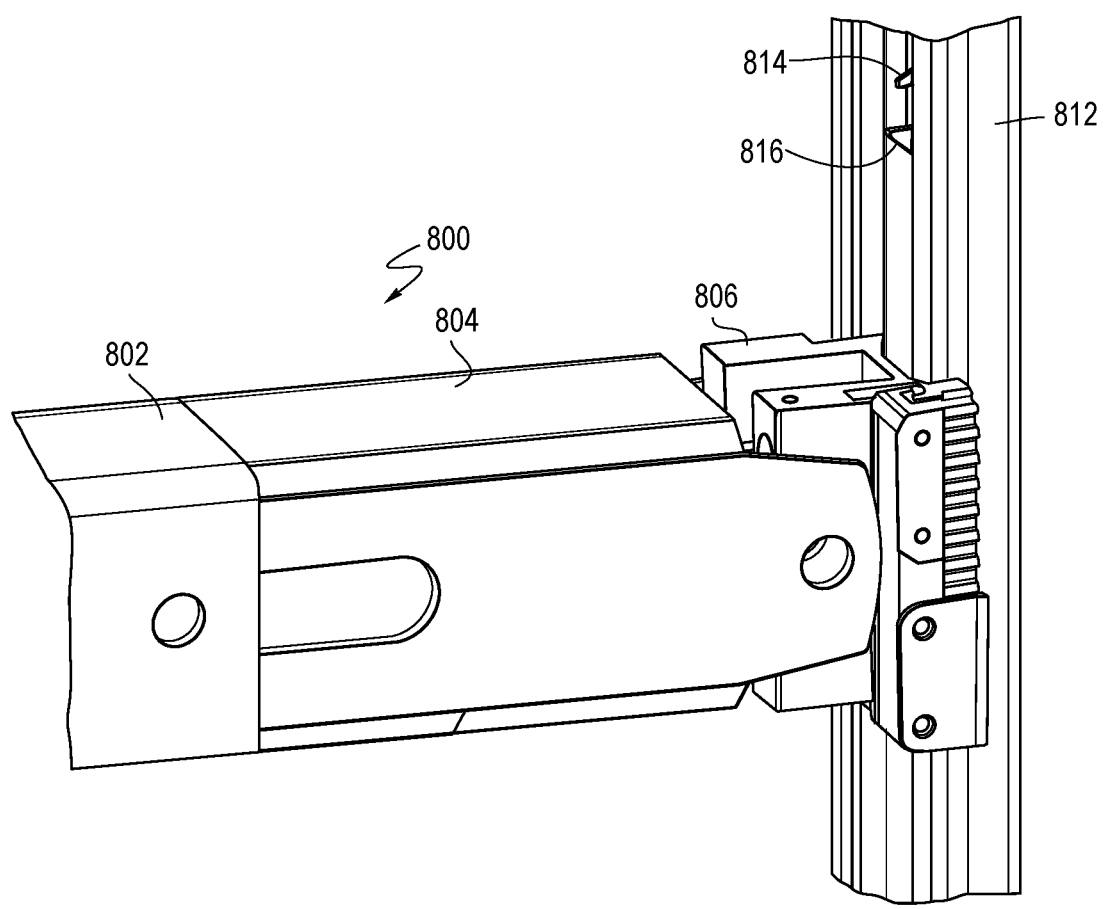
FIG. 8 is a schematic view of an embodiment of a bracket disposed upon a vertical track.

Referring to FIG. 8, in some embodiments, the horizontal support 106 may include a beam assembly 800 including a beam 802, and two collars 804 (only one collar 804 is shown for the sake of brevity), which are telescopingly mounted to the beam 802 to allow the length of the beam 802 to selectively extend (when the beam is at an angle) and shorten (when the beam is horizontal). Each collar 804 is connected to a bracket 806, and the collar 804 may be pivotable with respect to the bracket 806. A lifting cable may be connected to the bracket 806 such that the bracket 806 and the beam 802 can be moved upwardly and downwardly along a vertical track 812 by the lifting cable (as a non-limiting example), which is moved by a motor, as discussed in greater detail below. In other embodiments, the horizontal support may be a panel that has one or more cavities to allow wires to pass through as needed for up and down horizontal support, instead of a beam. The panel may be directly or indirectly connected to the bracket 806, which operates as discussed herein.

Figure 9:
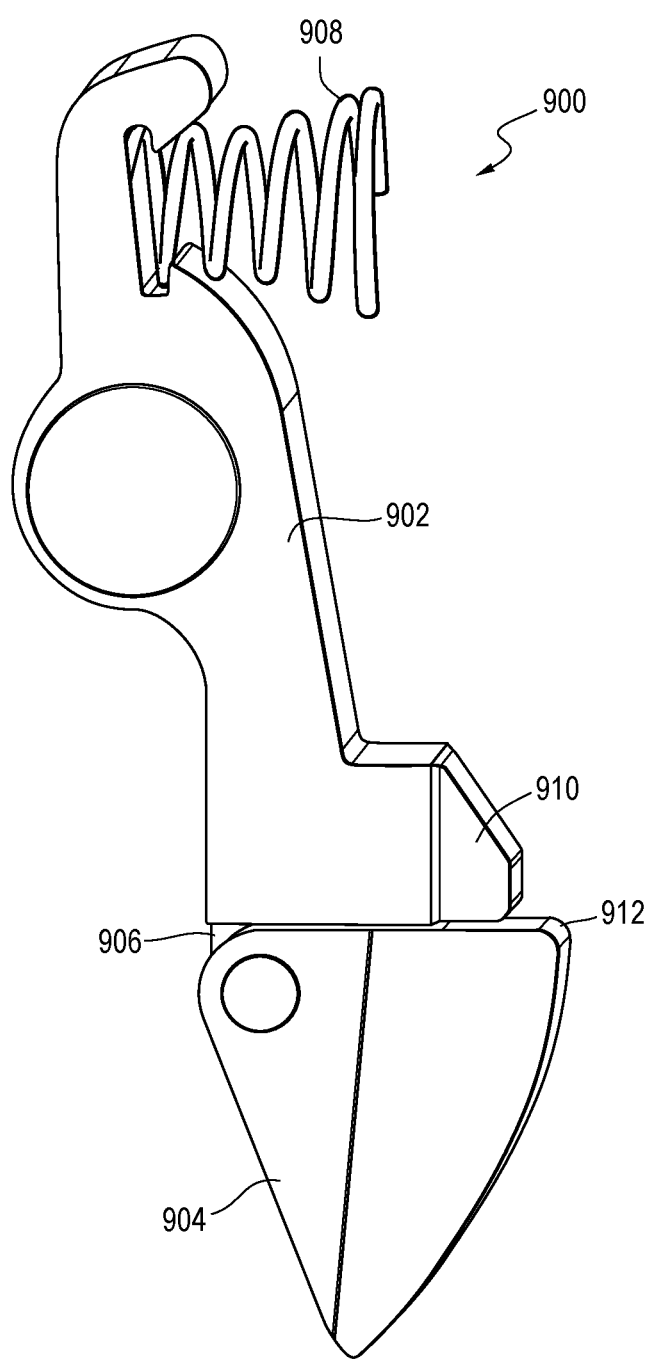
FIG. 9 is a side view of an embodiment of a latch including a rotating portion and a guide in accordance with certain aspects of the present disclosure.
Figure 10A:
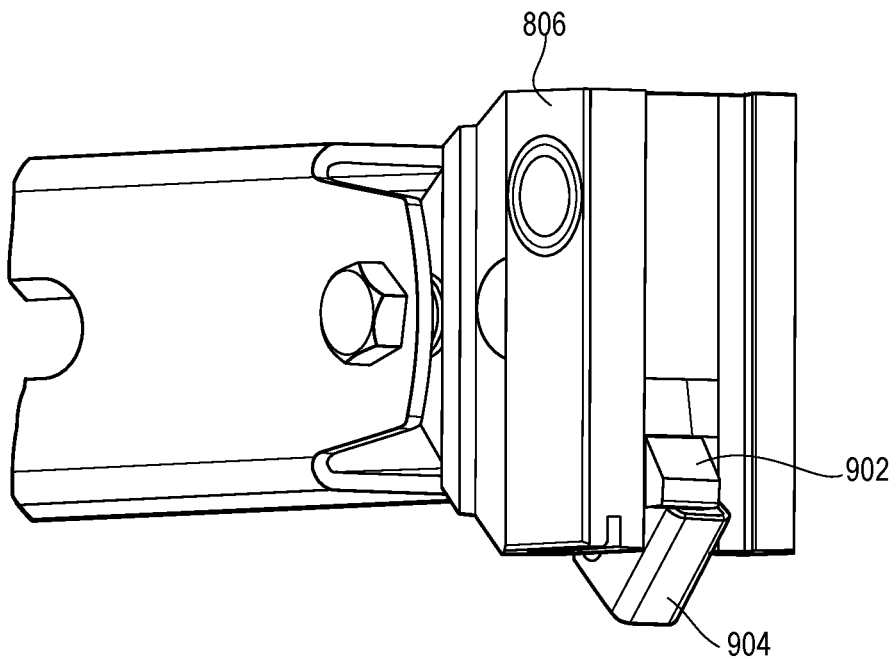
FIG. 10A is a perspective view of the latch of FIG. 9 mounted on a bracket with the guide biased against the rotating portion in accordance with certain aspects of the present disclosure.
Figure 10B:
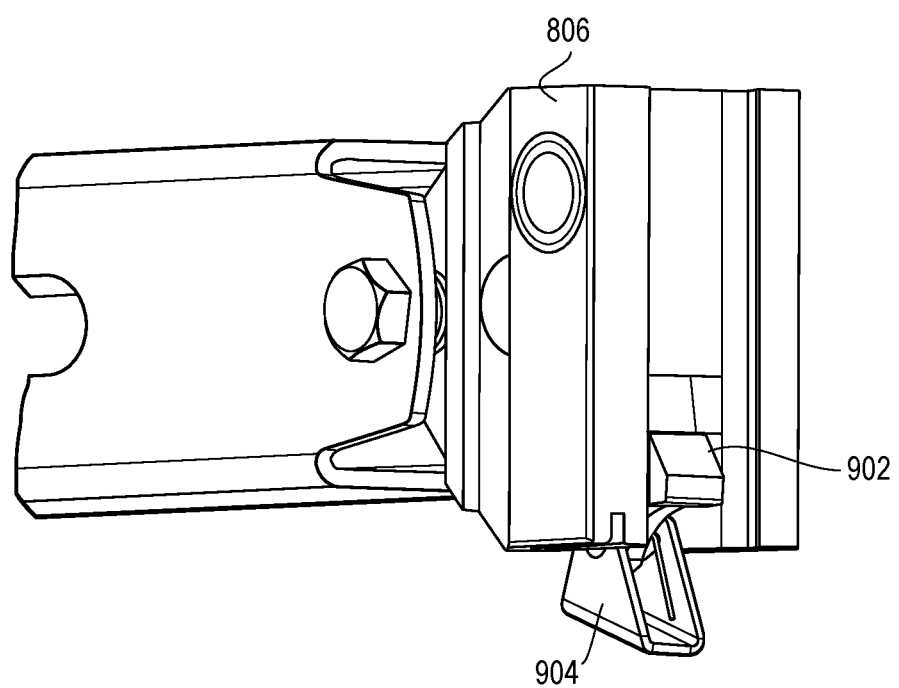
FIG. 10B is a perspective view of the latch of FIG. 9 mounted on a bracket with the guide rotating out of contact with the rotating portion in accordance with certain aspects of the present disclosure.

Referring to FIGS. 9-10B, in some embodiments, the bracket 806 may rotationally support a latch 900 having a rotating portion 902 and a guide 904, with the latch 900 mounted between the walls of the bracket 806. The guide 904 may be rotatably connected to the bottom portion 906 of the rotating portion 902 and biased towards the rotating portion 902 through a first spring (not shown). The rotating portion 902 may be biased by a second spring 908, as discussed in greater detail below. The latch 900 is provided to engage with one of the plurality of apertures within the vertical track 812 such that the beam 802 can be secured to a desired location along the vertical track 812.

Figure 11A:
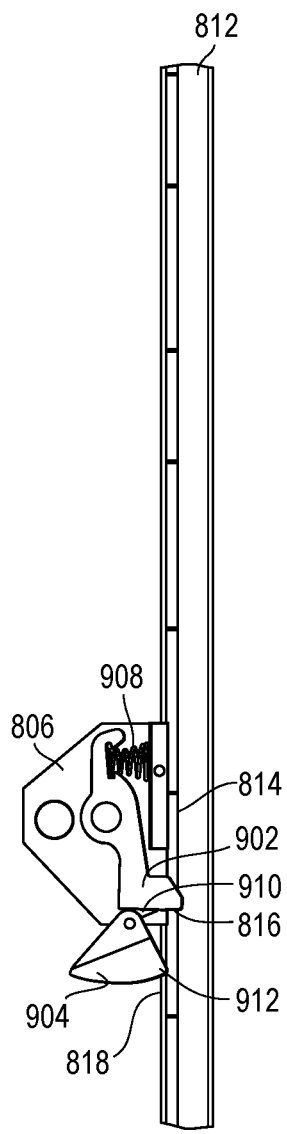
FIGS. 11A-11D are illustrations showing side cross-sectional views of the bracket and the latch of FIGS. 10A and 10B with respect to the vertical track as the bracket is moving up from initial alignment with a lower aperture in accordance with certain aspects of the present disclosure.
Figure 11B:
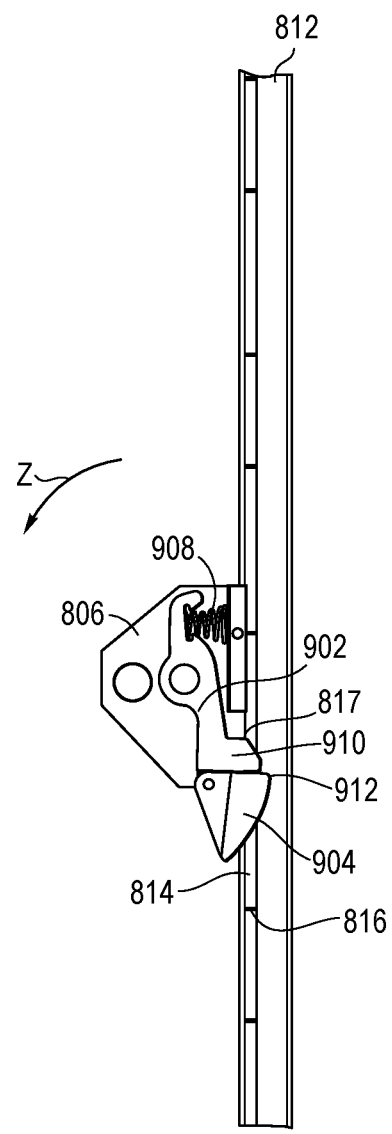
Figure 11C:
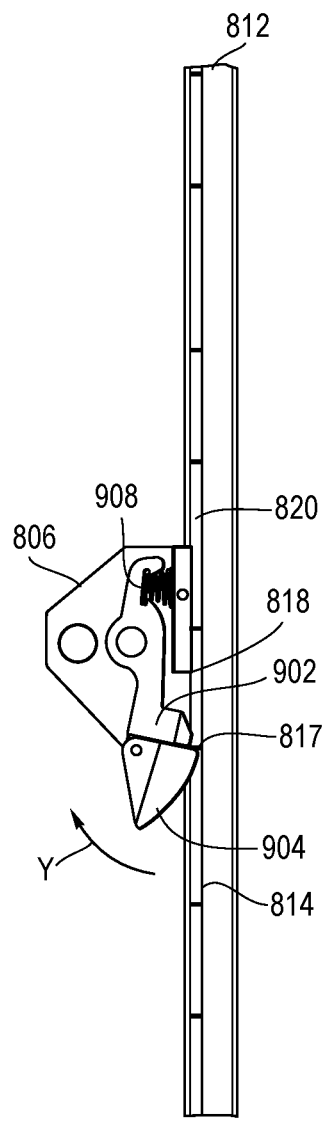

Referring to FIGS. 11A-11D, a method of raising the bracket 806 such that the latch 900 is moved from initial alignment with a lower aperture towards an upper aperture is described. When the rotating portion 902 is engaging the lower edge 816 of a lower aperture 814, the lower portion 910 of the rotating portion 902 rests upon the lower edge 816 of the lower aperture 814, and a connecting surface 912 of the guide 904 is biased against a central portion 818 of the vertical track 812 directly below the lower aperture 814, as shown in FIG. 11A. To disengage the latch 900 from the lower aperture 814, the bracket 806 is raised until the connecting surface 912 of the guide 904 is clear of the lower edge 816, and the first spring (not shown) urges the guide 904 to rotate in the direction Z until the guide 904 and the rotating portion 902 contact each other. At this position, a portion of the lower portion 910 of the rotating portion 902 and the guide 904 extend through the lower aperture 814, as shown in FIG. 11B.

Figure 11D:
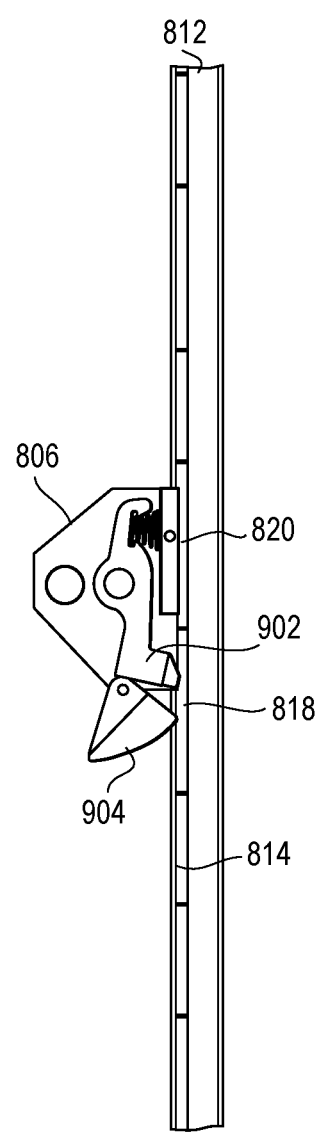

As the bracket 806 continues to raise, the biasing force of the second spring 908 urges the latch 900 to rotate in the direction Z until the rotating portion 902 contacts the upper edge 817 of the lower aperture 814 (FIG. 11B), which causes the rotating portion 902 to rotate in the direction Y such that the rotating portion 902 is free to slide vertically along the central portion 818 of the vertical track 812 toward the upper aperture 820. Then the guide 904 contacts the upper edge 817 of the lower aperture 814 (FIG. 11C), which causes the guide 904 to rotate in the direction Y and out of contact with the rotating portion 902, such that the latch 900 (the rotating portion 902 and the guide 904) is disengaged from the lower aperture 814 and free to slide vertically along the central portion 818 of the vertical track 812 toward the upper aperture 820 (FIG. 11D). One of ordinary skill in the art, with a thorough review of the specification and the figures will readily comprehend how the latch 900 can be lowered to engage a lower aperture disposed on the vertical track 812 without undue experimentation.

In some embodiments, as shown in FIG. 1, the horizontal support 106 (e.g., a decking beam) may include an inner cavity, lumen, or passageway 114 extending along a length of the horizontal support 106. The system 100 may include a balance cable 116 and a lifting cable 118 configured to raise and lower the horizontal support 106 along the respective vertical tracks 102 and 104 while maintaining the horizontal support 106 horizontal during the moving process, either with the horizontal support 106 loaded with cargo, or with the horizontal support 106 unloaded with cargo. The term "horizontal" is intended to describe the directions with respect to the floor of the cargo compartment where the vertical tracks are disposed above and is intended to include the specific directions referenced as well as a direction that is within 2.5 degrees around the direction referenced. The term "vertical" is intended to describe the directions with respect to the floor of the cargo compartment where the vertical tracks are disposed above and is intended to include the specific directions referenced as well as a direction that is within 2.5 degrees around the direction referenced. Although the structure is called "horizontal support," it will be appreciated that the structure may not always be horizontal. That is, the "horizontal support" may be in other orientations that are slightly off from horizontal depending upon whether the opposed walls are vertical and parallel with each other.

The balance cable 116 includes a first end 116*a* and an opposite second end 116*b*, and the balance cable 116 extends through the inner passageway 114 of the horizontal support 106. In some embodiments, as shown in FIG. 1, the first end 116*a* may be secured with respect to the first vertical track 102 at a first location 120 and the second end 116*b* may be secured with respect to the second vertical track 104 at a second location 122. The first location 120 may be higher than the second location 122, for example, as shown in FIG. 1, the first location 120 may be close to the ceiling of the cargo compartment and the second location 122 may be close to the floor of the cargo compartment.

In some embodiments, one or both ends of the balance cable 116 may be connected (directly or indirectly) to the respective vertical track that is proximate to the respective end of the balance cable 116. In some embodiments, one or both ends of the balance cable 116 may connect to a structural wall (such as a wall that supports the track). In still other embodiments, one end of the balance cable 116 may attach to a ceiling of the cargo compartment, and/or the other end may attach to a floor of the cargo compartment. In still other embodiments, one end of the balance cable 116 may extend below the floor of the cargo compartment. As used herein, the attachment of an end of the balance cable 116 may be a direct attachment, or by an indirect attachment.

In some embodiments, as shown in FIG. 1, the first and second brackets 108 and 110 may include first and second members 124 and 126, respectively, for directing (e.g., via slidably engaging) the balance cable 116 extending through the inner passageway 114. In some embodiments, the first and second members 124 and 126 may be pulleys or wheels that rotate as the horizontal support 106 moves along the balance cable 116, while in other embodiments, they may be low friction arcuate surfaces. In some embodiments, as shown in FIG. 1, the first member 124 disposed in the first bracket 108 may direct (e.g., via slidably engaging) the balance cable 116 extending from the first location 120, under the first member 124, into the inner passageway 114, and the second member 126 disposed in the second bracket 110 may direct (e.g., via slidably engaging) the balance cable 116 extending from the inner passageway 114, over the second member 126, towards the second location 122. One of ordinary skill in the art, with a thorough review of the subject specification and figures, will readily comprehend how the engagement between the balance cable 116 and the vertical tracks 102 and 104 and the engagement between the balance cable 116 and the horizontal support 106, as shown in this embodiment, may be implemented in other embodiments discussed below, as desired and/or needed.

In some embodiments, the balance cable 116 may have a predetermined length, which remains the same (because the balance cable 116 is not materially stretchable) when the first and second brackets 108 and 110 are raised or lowered along the respective first and second vertical tracks 102 and 104 by the operation of the motor 112, as discussed in greater detail below. In some embodiments, as shown in FIG. 1, the second end 116b of the balance cable 116 may be secured with respect to the second vertical track 104 through an adjustment mechanism 128 (e.g., a turnbuckle) such that the predetermined length of the balance cable 116 can be adjusted, as desired and/or needed, by manipulating the adjustment mechanism 128. The adjustment mechanism may include any suitable mechanisms, including but not limited to, turnbuckle, ratcheting spool/winch, over center cam, and jack screw. This adjustment may allow for convenient assembly and then convenient adjustment of the cable length after assembly. In some embodiments, adjustment of the balance cable length is necessary for leveling of the horizontal support.

In some embodiments, as shown in FIG. 1, the lifting cable 118 may be connected to the second bracket 110 and slidably engaged with a pulley 130 and the motor 112, such that the operation of the motor 112 in a first direction 132 (e.g., clockwise direction) causes the second bracket 110 to slide upwardly along the second vertical track 104, and the operation of the motor 112 in an opposite second direction 134 (e.g., counterclockwise direction) causes the second bracket 110 to slide downwardly along the second vertical track 104. In some embodiments, as shown in FIG. 1, the pulley 130 may be disposed above the uppermost portion of the second vertical track 104 and close to the ceiling, and the motor 112 may be disposed upon or under the floor of the cargo compartment (e.g., where the first and second vertical tracks 102 and 104 are disposed above). It will be appreciated that the cable drive, discussed above and in other embodiments of the system 100 discussed below, is just one example of methods of raising and lowering the second bracket 110, and in any embodiment of the system 100 discussed herein, the motor 112 may be operatively engaged with the second bracket 110 through any suitable means, including but not limited to, belt drive, cable drive, chain drive, lead screw, hydraulic cylinder, pneumatic cylinder, or any combination thereof, as long as the operation of the motor 112 may cause the second bracket 110 to slide upwardly or downwardly along the second vertical track 104.

Figure 2:
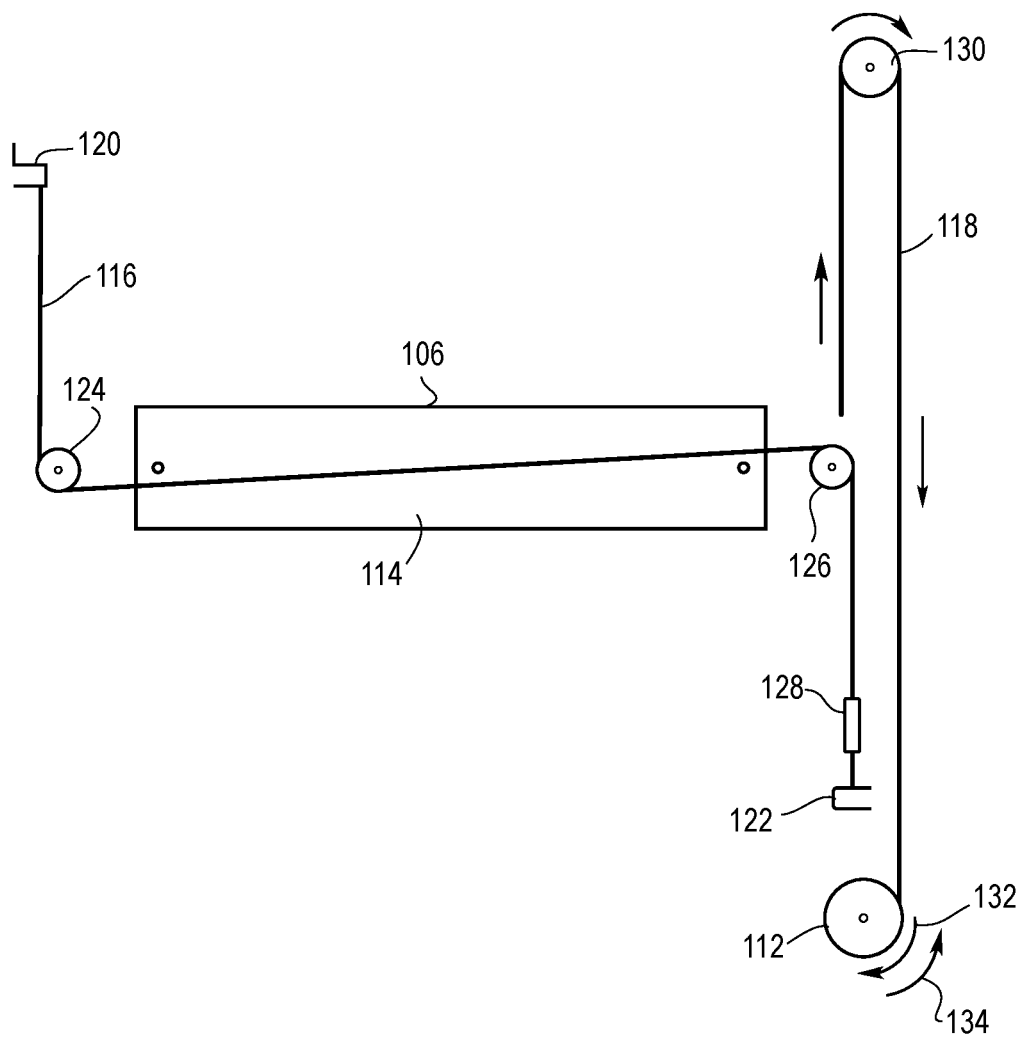
FIG. 2 is a schematic diagram of an embodiment of the cable arrangement of a motorized horizontal support system.

Referring to FIGS. 1 and 2, as the second bracket 110 slides upwardly along the second vertical track 104, the length of the portion of the balance cable 116 between the second member 126 and the second location 122 increases. As the balance cable 116 is not materially stretchable and its predetermined length (between the first location 120 and the second location 122) is fixed, the increase of the length of the portion between the second member 126 and the second location 122 causes the length of the portion between the first location 120 and the first member 124 to decrease by a same amount, thereby causing the first bracket 108 to slide upwardly along the vertical track 102 by a same distance as the second bracket 110 slides upwardly along the second vertical track 104. In other words, the operation of the motor 112 in the first direction 132 causes the first and second brackets 108 and 110 to slide upwardly along the respective first and second vertical tracks 102 and 104, while maintaining the horizontal support 106 horizontal during the upward motion.

As the second bracket 110 slides downwardly along the second vertical track 104, the length of the portion of the balance cable 116 between the second member 126 and the second location 122 decreases. As the balance cable 116 is not materially stretchable and its predetermined length (between the first location 120 and the second location 122) is fixed, the decrease of the length of the portion between the second member 126 and the second location 122 causes the length of the portion between the first location 120 and the first member 124 to increase by a same amount, thereby causing the first bracket 108 to slide downwardly along the first vertical track 102 by a same distance as the second bracket 110 slides downwardly along the second vertical track 104. In other words, the operation of the motor 112 in the second direction 134 may allow the horizontal support 106 to move downwardly due to force of gravity, which causes the first and second brackets 108 and 110 to slide downwardly along the respective first and second vertical tracks 102 and 104, while maintaining the horizontal support 106 horizontal during the downward motion. In some embodiments, as the horizontal support 106 moves down, the weight of the horizontal support 106 may create tension on the balancing cable 116, thereby maintaining the horizontal support 106 horizontal.

In conventional decking systems, when a decking beam is loaded with cargo, the decking beam cannot not be moved under load. The system 100 allows for the horizontal support 106 to be raised and lowered when the horizontal support 106 is supporting cargo. Accordingly, using this system, cargo will be able to be unloaded from a decked position without the need of a forklift, such as by lowering the horizontal support with cargo disposed thereon toward the floor of the cargo compartment. This is advantageous in allowing for the delivery of decked loads to locations without forklifts, which allows the "Home Delivery" or "Last-Mile Delivery" industry to pack trucks that are stacked with two levels of cargo for delivery—often to different customers, while using only a manually operated dolly to access the cargo to complete the delivery.

In use, a user may select a desired horizontal support 106 and set a desired position to which the desired horizontal support 106 is to be raised or lowered via the input device 200. That is, the vertical position of the first and second brackets 108 and 110 along the respective first and second vertical tracks 102 and 104 may be controlled, based upon inputs from a user from the input device 200, by selectively controlling the operation the motor 112 to selectively raise or lower the vertical position of both of the first and second brackets 108 and 110 upon the respective first and second vertical tracks 102 and 104.

In some embodiments, the input device 200 (shown schematically in FIG. 1) may be positioned proximate to the open end of the cargo compartment, and the input device 200 may include various interlock. For example, the input device 200 may require the user to continuously hold a button 202 on the input device 200 until the desired horizontal support has moved to the desired position, thereby preventing the user from being close to the moving horizontal support, and thus reducing the possibility for personal injury from a loaded horizontal support descending onto personnel. In some embodiments, electronic interlock mechanisms may be used (e.g., to monitor the underside of a horizontal support), such as light curtains or proximity censors, to watch for personnel or cargo, and thus reducing the possibility for personal injury and property damage. In some embodiments, the electronic interlock mechanisms (e.g., light curtains or proximity censors) may be mounted at the ceiling of the cargo compartment to monitor for cargo approaching the ceiling, thereby reducing the possibility of cargo interfering with the ceiling when raising the horizontal support. In some embodiments, load cell censors may be mounted at the ends of the horizontal supports to monitor the load's static weight. For example, if the load cell censor detects a change while the horizontal support is in motion (e.g., reduction of load in the case of a crushing incident, or the increase of load in the case of ceiling interference), the horizontal support may be immediately stopped and reversed. In some embodiments, this may also be accomplished with load detection in the motor used in the system.

Figure 3:
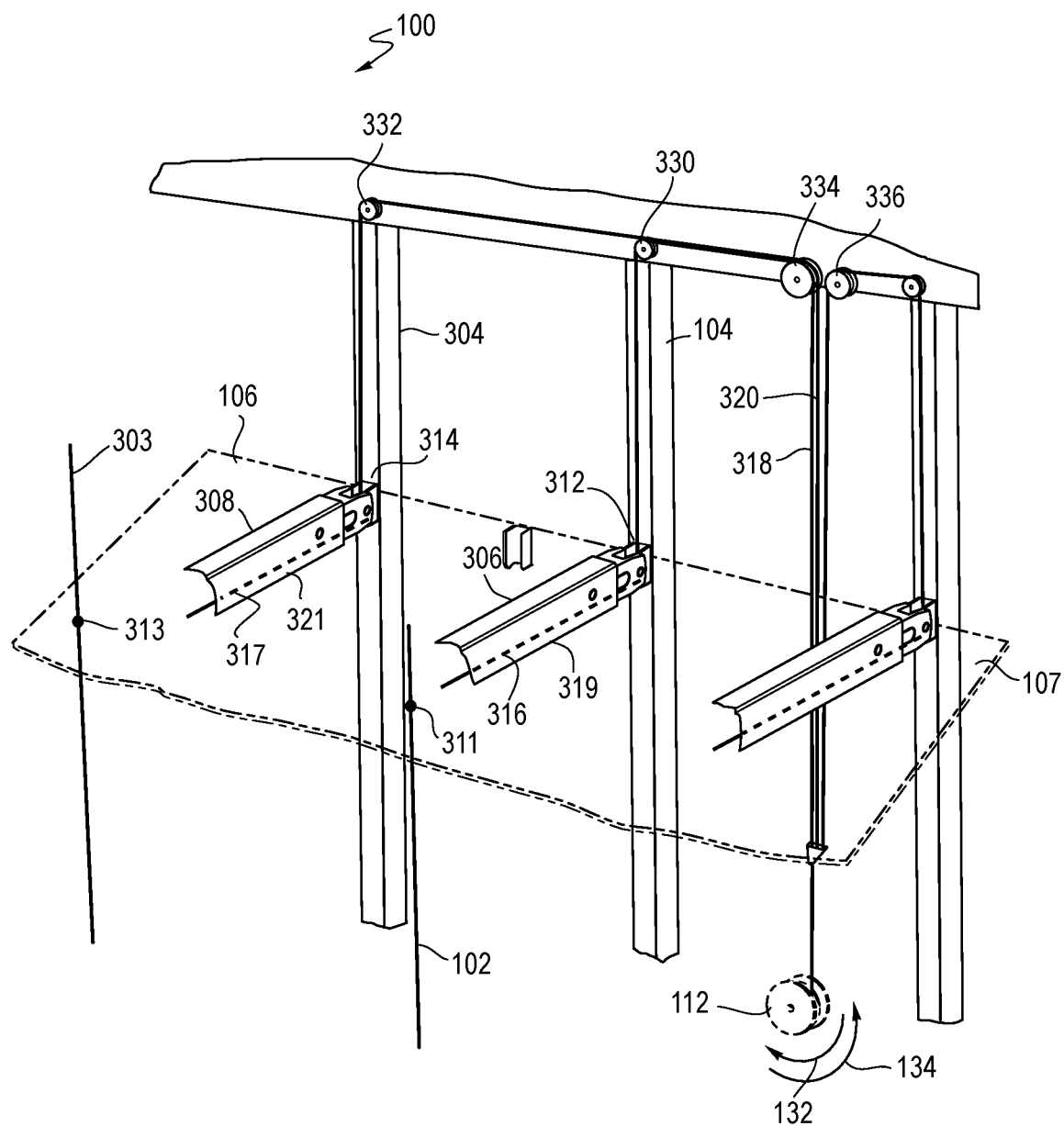
FIG. 3 is a schematic perspective view of another embodiment of a motorized horizontal support system connected to opposite side walls of a cargo compartment, such as a trailer.

In some embodiments, a single motor may be connected to a plurality of lifting cables that each connected to the horizontal support at different locations, thereby allowing the system 100 to support an increased load with the plurality of lifting cables moving simultaneously via the same motor while maintaining the horizontal support horizontal along its width. For example, as shown in FIG. 3, the system 100 may further include a third vertical track 303 and a fourth vertical track 304 (with the same configuration as the first and second vertical tracks 102 and 104) that are installed upon the opposing walls of the cargo compartment and spaced apart from the first and second vertical tracks 102 and 104, respectively. The horizontal support 106 may be disposed between and fixed with respect to the first and second vertical tracks 102 and 104 via a first bracket 311 and a second bracket 312, respectively, and may be disposed between and fixed with respect to the third and fourth vertical tracks 303 and 304 via a third bracket 313 and a fourth bracket 314, respectively, in the same manner as discussed above with respect to FIG. 1.

The horizontal support 106 may include a first inner passageway 319 and a second inner passageway 321 extending along the length of the horizontal support 106 and spaced apart from each other. In some embodiments, the first and second inner passageways 319 and 321 may be disposed under a top surface 107 of the horizontal support 106. In some embodiments, as shown in FIG. 3, the first inner passageway 319 may be disposed between the first and second vertical tracks 102 and 104 and the second inner passageway 321 may be disposed between the third and fourth vertical tracks 303 and 304. A first balance cable 316 may extend through the first inner passageway 319 of the horizontal support 106 and secures with respect to the first and second vertical tracks 102 and 104 in the same manner as discussed above with respect to the balance cable 116 in FIG. 1. A second balance cable 317 may extend through the second inner passageway 321 of the horizontal support 106 and secures with respect to the third and fourth vertical tracks 303 and 304 in the same manner as discussed above with respect to the balance cable 116 in FIG. 1.

In some embodiments, the horizontal support 106 may include a plurality of decking beams with or without a horizontal resting surface fixed above the decking beams, such that the plurality of decking beams may be raised and lowered simultaneously through a single motor. For example, as shown in FIG. 3, a first decking beam 306 and a second decking beam 308 may be raised and lowered by the operation of a single motor 112. A first decking beam 306 (with the same configuration as the horizontal support 106, as discussed with respect to FIG. 1) may be disposed between and fixed with respect to the first and second vertical tracks 102 and 104 via the first and second brackets 311 and 312, respectively, and a second decking beam 308 (with the same configuration as the horizontal support 106, as discussed with respect to FIG. 1) may be disposed between and fixed with respect to the third and fourth vertical tracks 313 and 314 via the third and fourth brackets 313 and 314, respectively, in the same manner as discussed above with respect to FIG. 1. The first balance cable 316 may extend through the inner passageway 319 of the first decking beam 306 and secures with respect to the first and second vertical tracks 102 and 104 in the same manner as discussed above with respect to the balance cable 116 in FIG. 1. The second balance cable 317 may extend through the inner passageway 321 of the second decking beam 308 and secures with respect to the third and fourth vertical tracks 303 and 304 in the same manner as discussed above with respect to the balance cable 116 in FIG. 1.

A first pulley 330 may be disposed in conjunction with the second vertical track 104, a second pulley 332 may be disposed in conjunction with the fourth vertical track 304, and a first main pulley 334 may be disposed in conjunction with the first and second pulleys 330 and 332. The first and second pulleys 330 and 332 may be disposed above the respective second and fourth vertical tracks 104 and 304 and close to the ceiling. A first lifting cable 318 may be connected to the second bracket 312 and slidably engaged with the first pulley 330, the first main pulley 334, and the motor 112. A second lifting cable 320 may be connected to the fourth bracket 314 and slidably engaged with the second pulley 332, the first main pulley 334, and the motor 112. Operation of the motor 112 in the first direction 132 may cause the first, second, third, and fourth brackets to slide upwardly along the respective vertical tracks, and operation of the motor in the opposite second direction 134 may cause the first, second, third, and fourth brackets to slide downwardly along the respective vertical tracks.

It will be appreciated that the number of lifting cables connected to the single motor for moving a horizontal support 106 may be varied, depending on the number of the inner passageways included in the horizontal support 106. A horizontal support 106 with a larger dimension might include a greater number of inner passageways such that a greater number of balance cables and lifting cables may be operatively engaged with the horizontal support 106 to support an increased load with the plurality of lifting cables moving simultaneously via the same motor 112 while maintaining the horizontal support 106 horizontal along its width.

It will be appreciated that the number of horizontal supports (e.g., decking beams) that can be moved together by the operation of a single motor 112 may be varied, as desired and/or needed, by varying the number of lifting cables slidably engaged with the motor 112 and the number of pulleys slidably engaged with the lifting cables, without departing from the scope of the present invention. In some embodiments, as shown in FIG. 3, more than one main pulley, such as the first main pulley 334 and the second main pulley 336, may be operatively engaged with the motor 112 to allow for a greater number of horizontal supports (e.g., decking beams) to be raised and lowered simultaneously by the operation of a single motor 112. One of ordinary skill in the art, with a thorough review of the subject specification and figures, would readily comprehend how the system 100 may be modified to include one or more motors to simultaneously control the movement of more than one horizontal support (e.g., decking beam) and would readily comprehend what number of the pulleys, main pulleys, and lifting cables might be suitable without undue experimentation.

Figure 4:
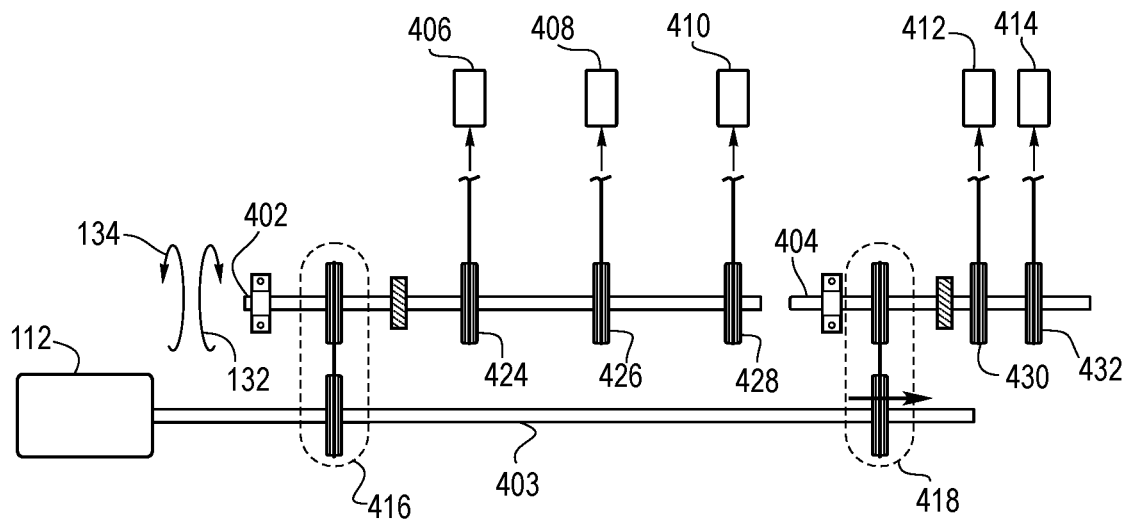
FIG. 4 is a schematic diagram of an embodiment of the motor-driven system of a motorized horizontal support system.

In some embodiments, the motor 112 may be selectively engaged with different sets of horizontal supports such that selected set(s) of horizontal supports may be simultaneously raised and lowered by the operation of the motor 112. For example, as shown in FIG. 4, the system 100 may include a first set of horizontal supports including a plurality of first horizontal supports (e.g., horizontal supports 406, 408, and 410) respectively extending between a first set of opposing vertical tracks, in the same manner as discussed above. The system 100 may also include a second set of horizontal supports including a plurality of second horizontal supports (e.g., horizontal supports 412 and 414) respectively extending between a second set of opposing vertical tracks, in the same manner as discussed above.

In some embodiments, a first shaft 402 may be operatively engaged with the first set of horizontal supports such that operation of the first shaft 402 in the first direction 132 (e.g., clockwise direction) may cause the plurality of first horizontal supports to respectively slide upwardly along the first set of opposing vertical tracks, and operation of the first shaft 402 in the opposite second direction 134 (e.g., counterclockwise direction) may cause the plurality of first horizontal supports to respectively slide downwardly along the first set of opposing vertical tracks. In some embodiments, as shown in FIG. 4, a first set of pulleys including a plurality of pulleys (e.g., the pulleys 424, 426, and 428) may be disposed in conjunction with the first set of horizontal supports, such as the horizontal supports 406, 408, and 410, respectively. The first set of pulleys may be secured to the first shaft 402 and configured to rotate in the first direction 132 when the first shaft 402 is operated in the first direction 132 and to rotate in the second direction 134 when the first shaft 402 is operated in the second direction 134, such that the first set of horizontal supports may be raised and lowered by the operation of the first shaft 402 via lifting cables slidably engaged with the first set of pulleys, as discussed above.

In some embodiments, a second shaft 404 may be operatively engaged with the second set of horizontal supports such that operation of the second shaft 404 in the first direction 132 may cause the plurality of second horizontal supports to respectively slide upwardly along the second set of opposing vertical tracks, and operation of the second shaft 404 in the opposite second direction 134 may cause the plurality of second horizontal supports to respectively slide downwardly along the second set of opposing vertical tracks. In some embodiments, as shown in FIG. 4, a second set of pulleys including a plurality of pulleys (e.g., the pulleys 430 and 432) may be disposed in conjunction with the second set of horizontal supports, such as the horizontal supports 412 and 414, respectively. The second set of pulleys may be secured to the second shaft 404 and configured to rotate in the first direction 132 when the second shaft 404 is operated in the first direction 132 and to rotate in the second direction 134 when the second shaft 404 is operated in the second direction 134, such that the second set of horizontal supports may be raised and lowered by the operation of the second shaft 404 via lifting cables slidably engaged with the second set of pulleys, as discussed above.

In some embodiments, as shown in FIG. 4, a main shaft 403 may be operatively engaged with the motor 112. The main shaft 403 may be configured to selectively engage at least one of the first shaft 402 or the second shaft 404 such that when the main shaft 403 engages both of the first and second shafts 402 and 404, operation of the motor 112 in the first direction 132 may cause the main, first, and second shafts 403, 402 and 404 to operate in the first direction 132, and operation of the motor 112 in the opposite second direction 134 may cause the main, first, and second shafts 403, 402 and 404 to operate in the second direction 134. In some embodiments, as shown in FIG. 4, the main shaft 403 may be releasably engaged with the first shaft 402 via a first engagement clutch 416 and releasably engaged with the second shaft 404 via a second engagement clutch 418. It will be appreciated that the number of sets of horizontal supports that can be moved simultaneously via the motor 112 may be varied, as desired and/or needed, by varying the number of shafts operatively engaged with corresponding sets of horizontal supports and releasably engaged with the main shaft 403. Also, it will be appreciated that the number of horizontal supports included in each set of horizontal supports may be varied, as desired and/or needed.

In use, a user may control a vertical position of at least one of the first set of horizontal supports or the second set of horizontal supports along the respective first and second sets of opposing vertical tracks by selectively controlling engagement between the main shaft 403 and at least one of the first shaft 402 or the second shaft 404 and the operation of the motor 112 to selectively raise or lower the vertical position of at least one of the first set or the second set of horizontal supports along the respective first and second sets of opposing vertical tracks. It will be appreciated that in the embodiment of the system 100, as shown in FIG. 4, each set of horizontal supports may be substituted with a single horizontal support including a plurality of inner passageways. One of ordinary skill in the art, with a thorough review of the subject specification and figures, will readily comprehend how the motor 112 in the embodiment of the system 100 as shown in FIG. 4 may be selectively engaged with different horizontal supports such that selected horizontal support(s) may be simultaneously raised and lowered by the operation of the motor 112.

Figure 5:
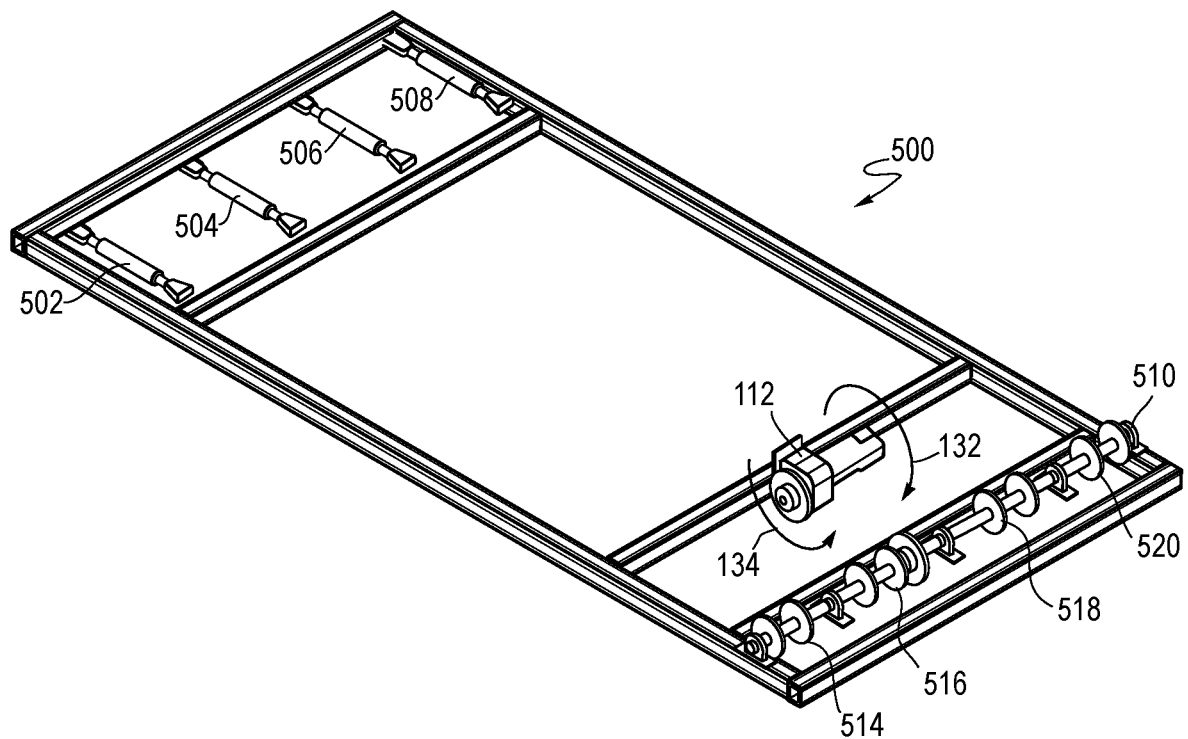
FIG. 5 is a schematic perspective view of an embodiment of a frame configured to be used in another embodiment of a motorized horizontal support system.

In some embodiments, the system 100 may include at least one frame disposed in conjunction with a set of horizontal supports (e.g., decking beams) including a plurality of horizontal supports. For example, as shown in FIG. 5, a frame 500 is provided. The frame 500 may include a plurality of spaced-apart adjustment mechanisms (e.g., turnbuckles 502, 504, 506, and 508) and a plurality of pulleys (e.g., 514, 516, 518, and 520) spacingly disposed along a pulley shaft 510. A motor 112 may be secured with respect to the frame 500 and operatively engaged with the pulley shaft 510 through one of the belt drive, cable drive, chain drive, lead screw, hydraulic cylinder, pneumatic cylinder, or any combination thereof such that operation of the motor 112 in the first direction 132 (e.g., clockwise direction) may cause the pulley shaft 510 and the plurality of pulleys (e.g., 514, 516, 518, and 520) to rotate in the first direction 132, and operation of the motor 112 in the opposite second direction 134 (e.g., counterclockwise direction) may cause the pulley shaft 510 and the plurality of pulleys (e.g., 514, 516, 518, and 520) to rotate in the opposite second direction 134.

In some embodiments, when the frame 500 is incorporated into the system 100 as shown in FIG. 1, the frame 500 may be secured with respect to the ceiling of the cargo compartment. For example, the first end 116a of the balance cable 116 may be secured with respect to the frame 500 through an adjustment mechanism (e.g., turnbuckle 502) and the second end 116b of the balance cable 116 may be secured with respect to the second vertical track 104 at a location close to the floor of the cargo compartment (e.g., at the second location 122). The motor 112 may be operatively engaged with the second bracket 110 through a pulley (e.g., pulley 514), where the lifting cable 118 may be connected to the second bracket 110 and slidably engaged with the pulley (e.g., pulley 514), such that operation of the motor 112 in the first direction 132 (e.g., clockwise direction) may cause the second bracket 110 to slide upwardly along the second vertical track 104, and operation of the motor 112 in the opposite second direction 134 (e.g., counterclockwise direction) may cause the second bracket 110 to slide downwardly along the second vertical track 104.

The plurality of spaced-apart adjustment mechanisms (e.g., turnbuckles 502, 504, 506, and 508) and the plurality of spaced-apart pulleys (e.g., 514, 516, 518, and 520) may be disposed in conjunction with a plurality of horizontal supports, respectively, such that the plurality of horizontal supports may be raised and lowered simultaneously. That is, the plurality of spaced-apart adjustment mechanisms (e.g., turnbuckles 502, 504, 506, and 508) may be configured to respectively secure a plurality of balance cables to the frame 500, where the plurality of balance cables are respectively engaged with first and second brackets fixed with respect to the plurality of horizontal supports, and the plurality of horizontal supports are respectively disposed between a plurality of opposing vertical tracks. The plurality of spaced-apart pulleys (e.g., 514, 516, 518, and 520) may be configured to respectively engage the second brackets fixed with respect to the plurality of horizontal supports (e.g., via respective lifting cables), such that operation of the motor 112 in the first direction 132 (e.g., clockwise direction) may cause the first and second brackets fixed with respect to the plurality of horizontal supports to respectively slide upwardly along the plurality of opposing vertical tracks, and operation of the motor in the opposite second direction 134 (e.g., counterclockwise direction) may cause the first and second brackets fixed with respect to the plurality of horizontal supports to respectively slide downwardly along the plurality of opposing vertical tracks.

It will be appreciated that the number of adjustment mechanisms and the number of pulleys disposed on the pulley shaft 510 may be varied, as desired and/or needed, such that a set of horizontal supports including a desired number of horizontal supports may be moved simultaneously by the operation of the motor 112. In some embodiments, more than one frame 500 may be included in the system 100, which allows for different sets of horizontal supports to be controlled separately via different motors. It will be appreciated that in the embodiment of the system 100, as shown in FIG. 5, each set of horizontal supports may be substituted with a single horizontal support including a plurality of inner passageways. One of ordinary skill in the art, with a thorough review of the subject specification and figures, will readily comprehend how the motor 112 in the embodiment of the system 100 as shown in FIG. 5 may be operatively engaged with the single horizontal support including a plurality of inner passageways such that the single horizontal support may be raised and lowered by the operation of the motor 112 while maintaining the horizontal support horizontal during the moving process.

Figure 6:
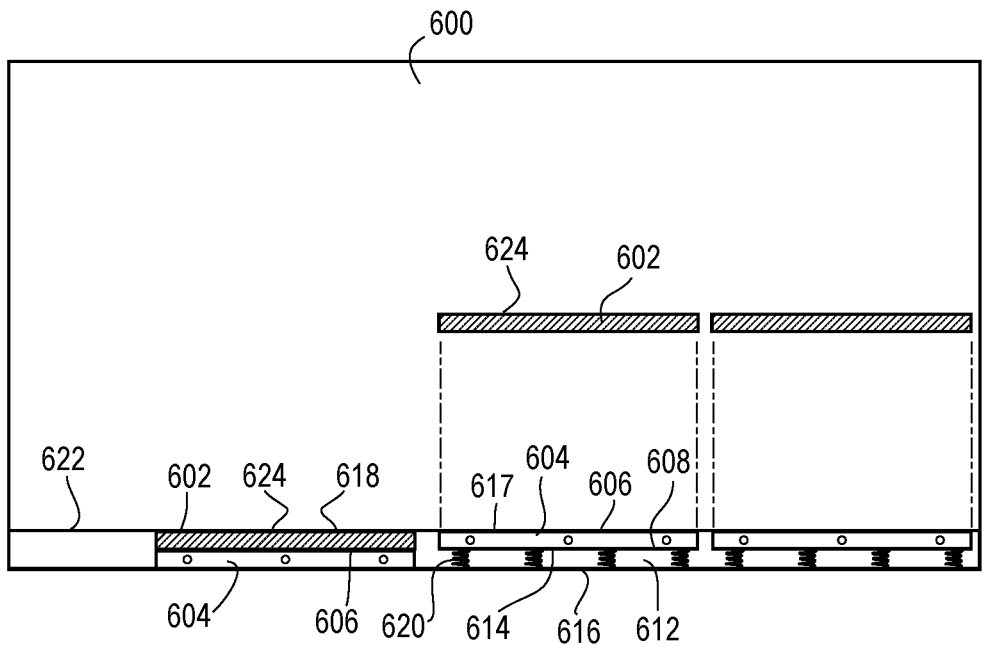
FIG. 6 is an embodiment of a floor system configured to be incorporated into a cargo compartment including a motorized horizontal support system.

In some embodiments, as shown in FIG. 6, the system 100 may be provided with a floor system 600. The floor system 600 may include a first panel 604 disposed upon a second panel 612. The first panel 604 may include an upper surface 606 and a lower surface 608, and the second panel 612 may include a top surface 614 and a bottom surface 616. The top surface 614 may be moveably connected to and disposed upon the bottom surface 616 (e.g., through a spring 620) such that the floor system 600 may be translatable between a first configuration 617 (e.g., default configuration, when no force is applied on the first panel 604) and a second configuration 618 (when force is applied on the first panel 604, e.g., via a horizontal support, either with the horizontal support loaded with cargo, or with the horizontal support unloaded with cargo). That is, a downward force applied on the first panel 604 may cause the floor system 600 to translate from the first configuration 617 to the second configuration 618. And when the downward force is removed, the floor system 600 may translate from the second configuration 618 back to the first configuration 617.

In some embodiments, as shown in FIG. 6, when the floor system 600 is in the first configuration 617, the upper surface 606 of the first panel 604 may be flush with a floor level 622 of the cargo compartment. A downward movement of a horizontal support 602 disposed on the first panel 604 may cause the top surface 614 of the second panel 612 to move downwardly towards the bottom surface 616 of the second panel 612 until the top surface 614 of the second panel 612 contacts the bottom surface 616 of the second panel 612. In this second configuration 618, an upper surface 624 of the horizontal support 602 disposed on the first panel 604 may be flush with the floor level 622 of the cargo compartment. Then, an upward movement of the horizontal support 602 disposed on the first panel 604 may cause the top surface 614 of the second panel 612 to move upwardly away from the bottom surface 616 of the second panel 612, and when the horizontal support 602 is moved away from the first panel 604, the floor system 600 may return to the first configuration 617 (e.g., where the upper surface 606 of the first panel 604 may be flush with the floor level 622 of the cargo compartment).

This configuration of the floor system 600 is advantageous for allowing the horizontal support 602 to be lined up with the level of the remaining floor, thereby providing a level floor for moving cargo onto and off the horizontal support 602 by a pallet jack without the need of using a ramp or other means. In use, an embodiment of the method of loading cargo onto the horizontal support 602 or unloading cargo from the horizontal support 602 may begin with an initial condition with the floor system 600 in the first configuration 617 and the horizontal support 602 being positioned at an elevated level. Then, the horizontal support 602 is lowered such that the horizontal support 602 contacts the upper surface 606 of the first panel 604. Continuing to lower the horizontal support 602 until the upper surface 624 of the horizontal support 602 is flush with the floor level 622 of the cargo compartment. Then, a user may use a pallet jack to load or upload cargo.

Figure 7:
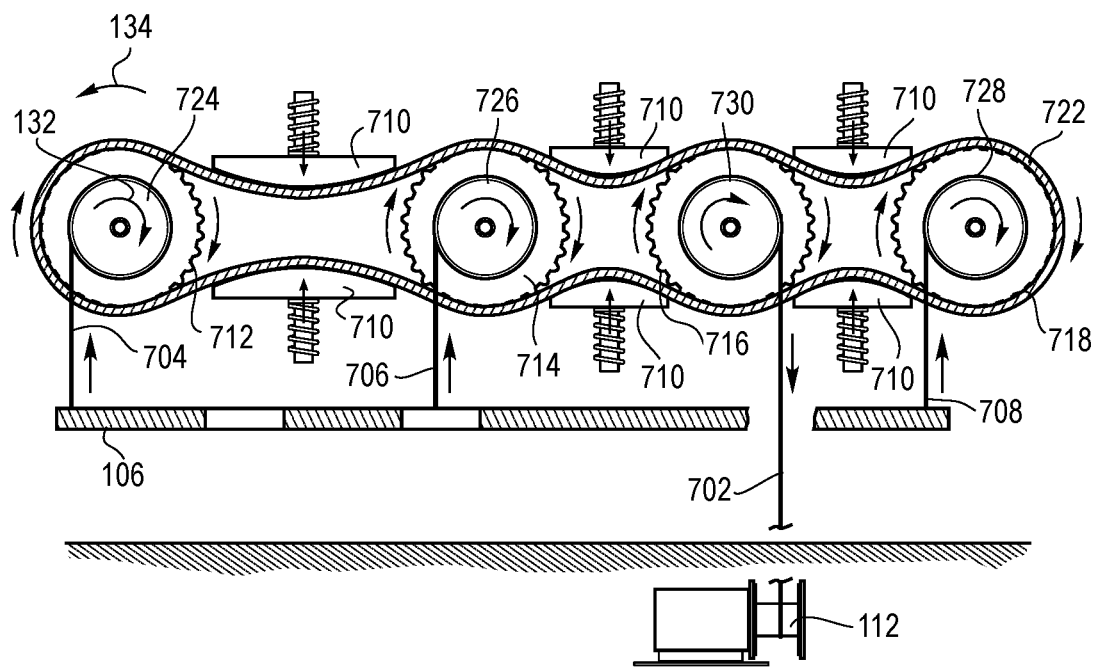
FIG. 7 is a schematic diagram of another embodiment of the motor-driven system of a motorized horizontal support system.

In some embodiments, a plurality of lifting cables (e.g., lifting cables 704, 706, and 708, as shown in FIG. 7) may be operatively engaged with a horizontal support 106 at different locations to support an increased load with the plurality of lifting cables moving simultaneously via a main cable 702 operatively engaged with the motor 112 while maintaining the horizontal support 106 horizontal along its width. For example, as shown in FIG. 7, the plurality of lifting cables 704, 706, and 708 may be operatively engaged with a plurality of idler gear wheels 712, 714, and 718, respectively, where the idler gear wheels 712, 714, and 718 each include spool components 724, 726, and 728 configured to wind the lifting cables 704, 706, and 708 when rotated in a first direction 132 (e.g., clockwise direction), thereby lifting the horizontal support 106 up, and to unwind the lifting cables 704, 706, and 708 when rotated in an opposite second direction 134 (e.g., counterclockwise direction), thereby lowering the horizontal support 106.

In some embodiments, a driven gear wheel 716 disposed in conjunction with the plurality of idler gear wheels 712, 714, and 718 may be operatively engaged with the motor 112 through the main cable 702, where the driven gear wheel 716 may include a spool component 730 configured to wind the main cable 702 when rotated in the second direction 134 (e.g., counterclockwise direction) and to unwind the main cable 702 when rotated in the first direction 132 (e.g., clockwise direction). In some embodiments, the driven gear wheel 716 may be operatively engaged with the plurality of idler gear wheels 712, 714, and 718 (e.g., via a chain 722 or other transmission wrapping around the driven gear wheel 716 and the plurality of idler gear wheels 712, 714, and 718) such that rotation of the driven gear wheel 716 in the first direction 132 may cause the plurality of idler gear wheels 712, 714, and 718 to rotate in first second direction 132 and rotation of the driven gear wheel 716 in the second direction 134 may cause the plurality of idler gear wheels 712, 714, and 718 to rotate in the second direction 134. In some embodiments, the chain 722 may include a plurality of tensioning components 710 (e.g., disposed between adjacent gear wheels) configured to ensure the proper engagement between the chain 722 and the idler and driven gear wheels.

In use, when the motor 112 rotates in the first direction 132, it may pull the main cable 702 to unwind the spool component 730 on the driven gear wheel 716 (unwind the main cable 702), thereby causing the driven gear wheel 716 and thus the idler gear wheels 712, 714, and 718 to rotate in the first direction 132, such that the horizontal support 106 may be lifted up. When the motor 112 rotates in the second direction 134, it may allow the main cable 702 to wind around the spool component 730 of the driven gear wheel 716, thereby due to the weight of the horizontal support 106 urging the plurality of lifting cables 704, 706, and 708 to unwind to lower the horizontal support 106 due to force of gravity.

Certain embodiments of the specification may be better understood with referenced to the numbered paragraphs below.

A1 In an example, a motorized horizontal support system, comprises: first and second vertical tracks that are configured to be installed upon opposing walls of a cargo compartment, wherein each of the first and second vertical tracks includes a plurality of apertures disposed spacingly therealong; first and second brackets that each slide along the respective first and second vertical tracks; a horizontal support disposed between and fixed with respect to the first and second brackets, wherein the horizontal support includes a first inner passageway extending along a length of the horizontal support; a first balance cable extending through the first inner passageway of the horizontal support, wherein the first balance cable includes a first end and an opposite second end; a motor operatively engaged with the second bracket, wherein operation of the motor in a first direction causes the first and second brackets to slide upwardly along the respective first and second vertical tracks, and wherein operation of the motor in an opposite second direction causes the first and second brackets to slide downwardly along the respective first and second vertical tracks; and a controller with user input capability, wherein the controller selectively controls the operation of the motor to selectively raise or lower a vertical position of both of the first and second brackets upon the respective first and second vertical tracks in response to an input received from an input device.

A2 The motorized horizontal support system of example A1, further comprises a floor system, wherein the floor system includes a first panel disposed upon a second panel, wherein the floor system is translatable between a first configuration and a second configuration, wherein when the floor system is in the first configuration, an upper surface of the first panel is flush with a floor level of the cargo compartment, and wherein when the floor system is in the second configuration, an upper surface of a horizontal support disposed on the first panel is flush with the floor level of the cargo compartment.

A3 The motorized horizontal support system of either of examples A1 or A2, wherein the second panel includes a top surface and a bottom surface, and wherein the top surface is moveably connected to and disposed upon the bottom surface such that a downward movement of the horizontal support disposed on the first panel causes the top surface of the second panel to move downwardly towards the bottom surface of the second panel.

A4 The motorized horizontal support system of any of examples A1-A3, wherein an upward movement of the horizontal support disposed on the first panel causes the top surface of the second panel to move upwardly away from the bottom surface of the second panel, and wherein when the horizontal support is moved away from the first panel, the floor system returns to the first configuration.

A5 The motorized horizontal support system of any of examples A1-A4, wherein the top surface of the second panel is connected to the bottom surface of the second panel through a spring.

B1 In an example, a method for adjusting a motorized horizontal support system, comprises the steps of: providing first and second vertical tracks on opposite walls of a cargo compartment, each of the first and second vertical tracks comprising a plurality of apertures disposed spacingly therealong; providing first and second brackets slidably mounted upon the respective first and second vertical tracks; providing a horizontal support disposed between and fixed with respect to the first and second brackets, wherein the horizontal support includes an inner passageway extending along a length of the horizontal support; providing a first balance cable extending through the inner passageway of the horizontal support, wherein the first balance cable includes a first end and an opposite second end; providing a motor operatively engaged with the second bracket, wherein operation of the motor in a first direction causes the first and second brackets to slide upwardly along the respective first and second vertical tracks, and wherein operation of the motor in an opposite second direction causes the first and second brackets to slide downwardly along the respective first and second vertical tracks; and controlling a vertical position of the first and second brackets along the respective first and second vertical tracks, based upon inputs from a user from an input device, by selectively controlling the operation of the motor to selectively raise or lower the vertical position of both of the first and second brackets upon the respective first and second vertical tracks.

B2 The method of example B1, wherein the motor is operatively engaged with the second bracket through one of belt drive, cable drive, chain drive, lead screw, hydraulic cylinder, or pneumatic cylinder.

B3 The method of either of examples B1 or B2, wherein the first balance cable is configured such that the horizontal support remains horizontal as the horizontal support is moved upwardly and downwardly upon the respective first and second vertical tracks.

B4 The method of any of examples B1-B3, wherein the first balance cable has a predetermined length that remains the same when the first and second brackets are raised or lowered along the respective first and second vertical tracks by the operation of the motor.

B5 The method of any of examples B1-B4, wherein the first and second brackets may be raised or lowered along the respective first and second vertical tracks by the operation of the motor when the horizontal support is supporting cargo.

B6 The method of any of examples B1-B5, wherein the first bracket includes a first member disposed therein for directing the first balance cable extending under the first member, and wherein the second bracket includes a second member disposed therein for directing the first balance cable extending over the second member.

B7 The method of any of examples B1-B6, wherein the first and second brackets support a first latch and a second latch respectively, and wherein the steps further comprise: selectively controlling the operation of the motor to selectively raise or lower the vertical position of both of the first and second brackets such that the first and second latches are aligned with and engage respective apertures disposed on the respective first and second vertical tracks such that the horizontal support is secured with respect to the first and second vertical tracks at a desired height.

B8 The method of any of examples B1-B7, wherein the first end of the first balance cable is secured with respect to the first vertical track at a first location, wherein the second end of the first balance cable is secured with respect to the second vertical track at a second location, and wherein the first location is higher than the second location.

B9 The method of any of examples B1-B8, further comprises: providing a first set of horizontal supports including a plurality of first horizontal supports respectively extending between a first set of opposing vertical tracks; providing a second set of horizontal supports including a plurality of second horizontal supports respectively extending between a second set of opposing vertical tracks; providing a first shaft operatively engaged with the first set of horizontal supports such that operation of the first shaft in the first direction causes the plurality of first horizontal supports to respectively slide upwardly along the first set of opposing vertical tracks, and operation of the first shaft in the opposite second direction causes the plurality of first horizontal supports to respectively slide downwardly along the first set of opposing vertical tracks; providing a second shaft operatively engaged with the second set of horizontal supports such that operation of the second shaft in the first direction causes the plurality of second horizontal supports to respectively slide upwardly along the second set of opposing vertical tracks, and operation of the second shaft in the opposite second direction causes the plurality of second horizontal supports to respectively slide downwardly along the second set of opposing vertical tracks; providing a main shaft connected to the motor, wherein the main shaft is configured to selectively engage at least one of the first shaft or the second shaft, and wherein when the main shaft engages both of the first and second shafts, the operation of the motor in the first direction causes the first and second shafts to operate in the first direction, and the operation of the motor in the opposite second direction causes the first and second shafts to operate in the opposite second direction; and controlling a vertical position of at least one of the first set of horizontal supports or the second set of horizontal supports along the respective first and second sets of opposing vertical tracks by selectively controlling engagement between the main shaft and at least one of the first shaft or the second shaft and the operation of the motor to selectively raise or lower the vertical position of at least one of the first set or the second set of horizontal supports along the respective first and second sets of opposing vertical tracks.

B10 The method of any of examples B1-B9, wherein the main shaft is configured to selectively engage at least one of the first shaft or the second shaft through first and second engagement clutches respectively.

B11 The method of any of examples B1-B10, further comprises: providing a floor system, wherein the floor system includes a first panel disposed upon a second panel, wherein the floor system is translatable between a first configuration and a second configuration, wherein when the floor system is in the first configuration, an upper surface of the first panel is flush with a floor level of the cargo compartment, and wherein when the floor system is in the second configuration, an upper surface of a horizontal support disposed on the first panel is flush with the floor level of the cargo compartment.

B12 The method of any of examples B1-B11, further comprises: lowering the horizontal support such that the horizontal support contacts the upper surface of the first panel; and continuing to lower the horizontal support until the upper surface of the horizontal support is flush with the floor level of the cargo compartment.

B13 The method of any of examples B1-B12, wherein the second panel includes a top surface and a bottom surface, and wherein the top surface is moveably connected to and disposed upon the bottom surface such that a downward movement of the horizontal support disposed on the first panel causes the top surface of the second panel to move downwardly towards the bottom surface of the second panel.

B14 The method of any of examples B1-B13, wherein an upward movement of the horizontal support disposed on the first panel causes the top surface of the second panel to move upwardly away from the bottom surface of the second panel, and wherein when the horizontal support is moved away from the first panel, the floor system returns to the first configuration.

B15 The method of any of examples B1-B14, wherein the top surface of the second panel is connected to the bottom surface of the second panel through a spring.

B16 The method of any of examples B1-B15, further comprises providing a frame configured to be secured with respect to a ceiling of the cargo compartment, wherein the frame includes an adjustment mechanism and a pulley.

B17 The method of any of examples B1-B16, wherein the motor is secured with respect to the frame.

B18 The method of any of examples B1-B17, wherein the first end of the first balance cable is secured with respect to the frame through the adjustment mechanism, and wherein the second end of the first balance cable is secured with respect to the second vertical track.

B19 The method of any of examples B1-B18, wherein the motor is operatively engaged with the second bracket through the pulley.

B20 The method of any of examples B1-B19, wherein the frame includes a plurality of spaced-apart adjustment mechanisms, wherein the frame includes a plurality of pulleys spacingly disposed along a pulley shaft, wherein the motor is operatively engaged with the pulley shaft, wherein the operation of the motor in the first direction causes the pulley shaft and the plurality of pulleys to rotate in the first direction, and wherein the operation of the motor in the opposite second direction causes the pulley shaft and the plurality of pulleys to rotate in the opposite second direction.

B21 The method of any of examples B1-B20, wherein the plurality of spaced-apart adjustment mechanisms are configured to respectively secure a plurality of balance cables to the frame, the plurality of balance cables being respectively engaged with first and second brackets fixed with respect to a plurality of horizontal supports, the plurality of horizontal supports being respectively disposed between a plurality of opposing vertical tracks, wherein the plurality of pulleys are configured to respectively engage the second brackets fixed with respect to the plurality of horizontal supports, wherein the operation of the motor in the first direction causes the first and second brackets fixed with respect to the plurality of horizontal supports to respectively slide upwardly along the plurality of opposing vertical tracks, and wherein the operation of the motor in the opposite second direction causes the first and second brackets fixed with respect to the plurality of horizontal supports to respectively slide downwardly along the plurality of opposing vertical tracks.

While the preferred embodiments of the disclosed have been described, it should be understood that the invention is not so limited and modifications may be made without departing from the disclosure. For example, it is contemplated that the motorized decking assembly according to the present disclosure may also be used outside vehicle compartments, such as in storage facilities. The scope of the disclosure is defined by the appended claims, and all devices that come within the meaning of the claims, either literally or by equivalence, are intended to be embraced therein.

The invention claimed is:

1. A motorized horizontal support system, comprising:
   first and second vertical tracks that are configured to be installed upon opposing walls of a cargo compartment, wherein each of the first and second vertical tracks includes a plurality of apertures;
   first and second brackets that each slide along the respective first and second vertical tracks;
   a horizontal support disposed between and fixed with respect to the first and second brackets, wherein the horizontal support includes a first inner passageway extending along a length of the horizontal support;
   a first balance cable extending through the first inner passageway of the horizontal support, wherein the first balance cable includes a first end and an opposite second end;
   third and fourth vertical tracks that are configured to be installed upon the opposing walls of the cargo compartment, wherein each of the third and fourth vertical tracks includes a plurality of apertures, and wherein, when installed, the third and fourth vertical tracks are spaced apart from the first and second vertical tracks, respectively;
   third and fourth brackets that each slide along the respective third and fourth vertical tracks, wherein the horizontal support is disposed between and fixed with respect to the first, second, third, and fourth brackets; and wherein the horizontal support further comprises a second inner passageway extending along the length of the horizontal support and spaced apart from the first inner passageway;
   a second balance cable extending through the second inner passageway of the horizontal support, wherein the second balance cable includes a first end and an opposite second end,
   a motor operatively engaged with the second bracket and the fourth bracket, wherein operation of the motor in a first direction causes the first, second, third, and fourth brackets to slide upwardly along their respective vertical tracks, and wherein the operation of the motor in an opposite second direction causes the first, second, third, and fourth brackets to slide downwardly along their respective vertical tracks; and
   a controller with user input capability, wherein the controller selectively controls the operation of the motor to selectively raise or lower a vertical position of the first, second, third, and fourth brackets in response to an input received from an input device.

2. The motorized horizontal support system of claim 1, wherein the horizontal support comprises one of a decking beam or a plurality of adjacent decking beams with a support surface disposed above the plurality of adjacent decking beams.

3. The motorized horizontal support system of claim 1, wherein the horizontal support comprises a rigid horizontal surface with one or more passageways for a cable to pass therethrough.

4. The motorized horizontal support system of claim 1, wherein the motor is operatively engaged with the second bracket through one of belt drive, cable drive, chain drive, lead screw, hydraulic cylinder, or pneumatic cylinder.

5. The motorized horizontal support system of claim 1, wherein when the first and second brackets are raised or lowered along the respective first and second vertical tracks by the operation of the motor, the horizontal support remains horizontal.

6. The motorized horizontal support system of claim 1, wherein the first balance cable has a predetermined length that remains the same when the first and second brackets are raised or lowered along the respective first and second vertical tracks by the operation of the motor.

7. The motorized horizontal support system of claim 1, wherein the first bracket includes a first member disposed therein for directing the first balance cable extending under the first member, and wherein the second bracket includes a second member disposed therein for directing the first balance cable extending over the second member.

8. The motorized horizontal support system of claim 7, wherein the first member is configured for slidably engaging the first balance cable extending under the first member, and wherein the second member is configured for slidably engaging the first balance cable extending over the second member.

9. The motorized horizontal support system of claim 1, wherein the first and second brackets support a first latch and a second latch respectively, and wherein the first and second latches are configured to selectively engage respective apertures disposed on the respective first and second vertical tracks such that the horizontal support can be secured with respect to the first and second vertical tracks at a desired height.

10. The motorized horizontal support system of claim 1, wherein the first end of the first balance cable is secured with respect to the first vertical track, and wherein the second end of the first balance cable is secured with respect to the second vertical track.

11. The motorized horizontal support system of claim 10, wherein the first end of the first balance cable is secured to the first vertical track or a first side wall of the cargo compartment, and wherein the second end of the first balance cable is secured to the second vertical track or a second side wall of the cargo compartment.

12. The motorized horizontal support system of claim 10, wherein the second end of the first balance cable is secured with respect to the second vertical track through an adjustment mechanism such that a predetermined length of the first balance cable can be adjusted via the adjustment mechanism.

13. The motorized horizontal support system of claim 10, wherein the first end of the first balance cable is secured with respect to the first vertical track at a first location, wherein the second end of the first balance cable is secured with respect to the second vertical track at a second location, and wherein the first location is higher than the second location.

14. The motorized horizontal support system of claim 1, wherein the motor is disposed under a floor where the first and second vertical tracks are disposed above.

* * * * *

UNITED STATES PATENT AND TRADEMARK OFFICE
CERTIFICATE OF CORRECTION

| | | |
|---|---|---|
| PATENT NO. | : 12,419,414 B2 | Page 1 of 1 |
| APPLICATION NO. | : 17/777919 | |
| DATED | : September 23, 2025 | |
| INVENTOR(S) | : Robert Joseph Williams, Jerome Thomas Jones and Gregory Alan Kauffman | |

It is certified that error appears in the above-identified patent and that said Letters Patent is hereby corrected as shown below:

In the Claims

Under Column no. 20, Claim 9, Line no. 46, please replace "latches arc configured" with --latches are configured--.

Signed and Sealed this
Eighteenth Day of November, 2025

John A. Squires
*Director of the United States Patent and Trademark Office*